(12) United States Patent
Saito

(10) Patent No.: US 6,398,256 B1
(45) Date of Patent: *Jun. 4, 2002

(54) VEHICLE INSTRUMENT PANEL

(75) Inventor: Kazuhiro Saito, Omiya (JP)

(73) Assignee: Kansei Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/510,457

(22) Filed: Feb. 22, 2000

(30) Foreign Application Priority Data

Feb. 22, 1999 (JP) .......................... 11-043236

(51) Int. Cl.7 .............................. B60R 21/16
(52) U.S. Cl. ..................................... 280/732
(58) Field of Search ......................... 280/732

(56) References Cited

U.S. PATENT DOCUMENTS

| | | | |
|---|---|---|---|
| 5,443,777 A | * | 8/1995 | Mills .......................... 264/255 |
| 5,531,471 A | * | 7/1996 | Terai .......................... 280/732 |
| 5,806,880 A | * | 9/1998 | Gray .......................... 280/728.3 |
| 5,839,752 A | * | 11/1998 | Yamasaki et al. ........ 280/728.3 |
| 5,915,724 A | * | 6/1999 | Daris et al. .............. 280/728.3 |
| 5,979,931 A | * | 11/1999 | Totani et al. ............. 280/728.3 |
| 6,106,003 A | * | 8/2000 | Rahmstorf et al. ...... 280/728.3 |

* cited by examiner

Primary Examiner—Brian L. Johnson
Assistant Examiner—Faye M. Fleming
(74) Attorney, Agent, or Firm—Morrison Law Firm

(57) ABSTRACT

A sub panel concealing an airbag is mounted in the instrument panel of a vehicle. The sub panel covering a portion of the instrument panel appears to be part of the instrument panel. The inner surface of the sub panel has cleavage grooves that split open during a vehicle collision allowing the airbag to expand, protecting the passenger. The sub panel and airbag unit are replaceable after the airbag is deployed, restoring the instrument panel functionality. In the preferred embodiment, the sub panel covers a portion of the instrument panel on the passenger side of the vehicle.

15 Claims, 12 Drawing Sheets

VEHICLE INSTRUMENT PANEL

BACKGROUND OF THE INVENTION

The present invention relates to a vehicle instrument panel. More specifically, the present invention relates to a vehicle instrument panel with a replaceable sub panel which conceals an airbag.

Referring to FIG. 22, prior art vehicles, such as cars, provide for passenger safety with an airbag (not shown) installed in a section of an instrument panel 1. During a collision, an airbag unit 2 is activated allowing the airbag to expand, protecting passengers (not shown).

A cleavage groove 3 splits open when the airbag expands. Cleavage groove 3 is disposed along an inner surface of instrument panel 1. Airbag lid parts 4, disposed within instrument panel 1, also open when cleavage groove 3 splits. Because cleavage groove 3 faces an inner surface of instrument panel 1, it is hidden from view. The aesthetic appearance of instrument panel 1 is improved by concealing the presence of the airbag and associated cleavage groove 3.

However in the prior art, because cleavage groove 3 is disposed directly on an inner surface of instrument panel 1, after airbag unit 2 is activated, entire instrument panel 1 must be replaced when repairing the vehicle. This increases the cost and complexity of repairing the vehicle.

OBJECTS AND SUMMARY OF THE INVENTION

It is an object of the present invention to overcome the drawbacks of the prior art.

It is another object of the present invention to provide an attractive instrument panel that effectively conceals an airbag.

It is yet another object of the present invention to provide a sub panel airbag assembly that allows easy replacement of a deployed airbag.

Briefly stated, the present invention provides a sub panel concealing an airbag mounted in the instrument panel of a vehicle. The sub panel covering a portion of the instrument panel appears to be part of the instrument panel. The inner surface of the sub panel has cleavage grooves that split open during a vehicle collision allowing the airbag to expand, protecting the passenger. The sub panel and airbag unit are replaceable after the airbag is deployed, restoring the instrument panel functionality. In the preferred embodiment, the sub panel covers a portion of the instrument panel on the passenger side of the vehicle.

According to an embodiment of the invention, there is provided a vehicle instrument panel comprising: an instrument panel body having an opening; a sub panel; the opening being closed by the sub panel; an airbag disposed within the sub panel; the sub panel having at least one of a cleavage groove disposed on a surface of the sub panel whereby when the airbag is deployed, the cleavage groove splits open; and the sub panel covering less than all of the instrument panel body.

According to another embodiment of the invention. there is provided an instrument sub panel comprising: a sub panel unit covering less than all of an instrument panel of a vehicle; the sub panel unit being removably insertable in the instrument panel; at least a first cleavage groove disposed on a surface of the sub panel unit whereby at least the first cleavage groove is cleavable during a vehicle collision by the airbag; and means for removably securing the sub panel unit to the instrument panel whereby the sub panel unit appears to be integrally associated with the instrument panel.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
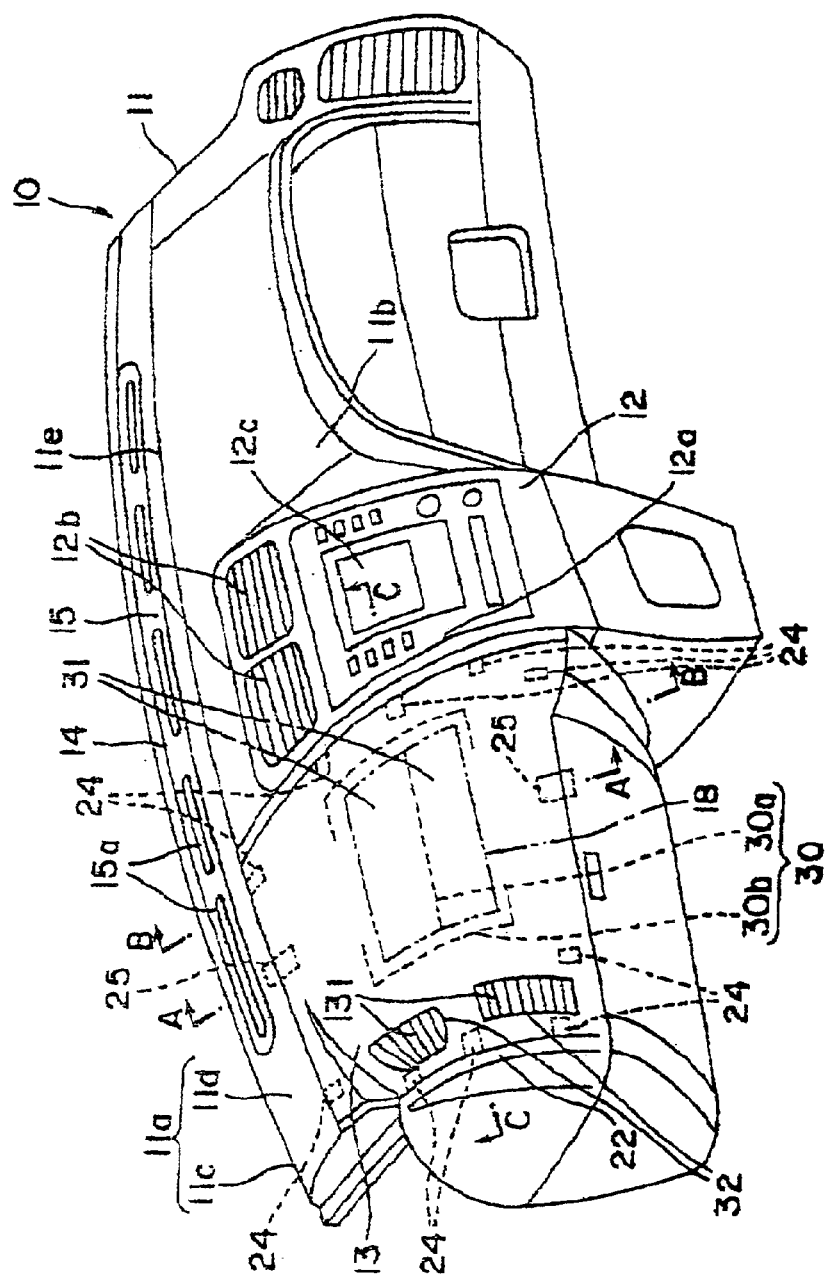
FIG. 1 is a perspective drawing of the instrument panel relating to the present invention.

Referring to FIG. 1, an instrument panel 10 of a vehicle (not shown), such as a car, has an instrument panel body 11. Instrument panel body 11 transversely extends from one side of the vehicle to the other. A central panel (cluster lid) 12 is centrally disposed on instrument panel body 11. A sub panel 13 is disposed on the passenger side of the vehicle.

Figure 2:
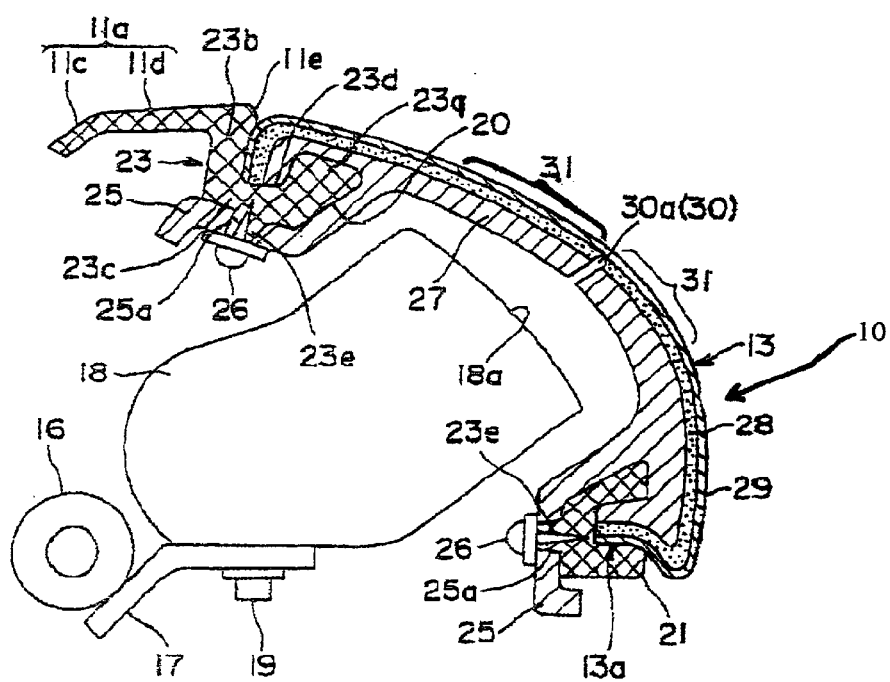
FIG. 2 is a cross-section drawing along line A—A of FIG. 1.
Figure 3:
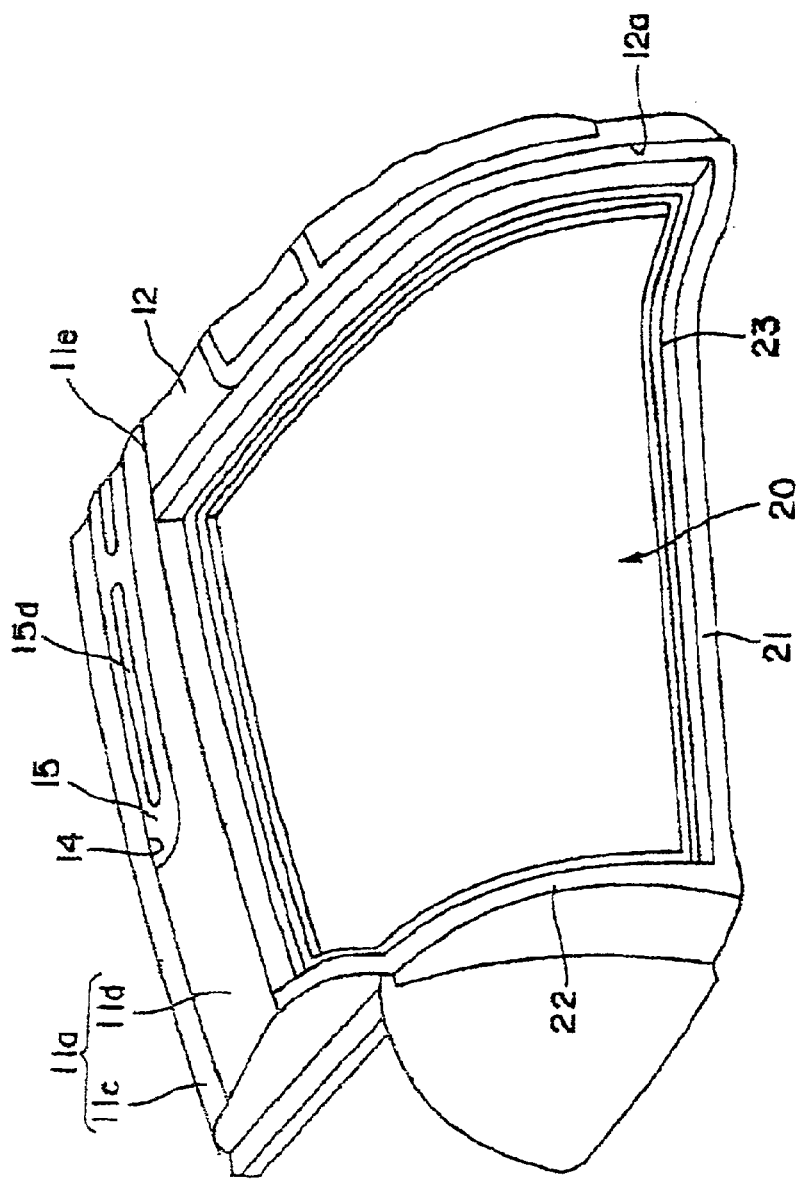
FIG. 3 is an expanded perspective drawing of the essential parts of the section attached to the sub panel of FIG. 1.

Referring to FIGS. 1 through 3. instrument panel body 11 includes a forward section 11a disposed along its front edge and a backward inclining section 11b which is continuous with, but extending away from forward section 11a. Forward section 11a includes a forward inclining piece 11c and a horizontal piece 11d. A ridge line 11e is formed where horizontal piece 11d joins with backward inclining section 11b. A longitudinal defroster opening 14 is disposed in horizontal piece 11d. Air is blown through air openings 15a. A grill 15 covers defroster opening 14.

Referring to FIG. 2, a steering member 16 is disposed within instrument panel body 10. A bracket 17 is welded onto the section of steering member 16 that corresponds to the passenger side. The front end of an airbag unit 18 is anchored to bracket 17 by a bolt 19. Airbag unit 18 inclines diagonally upwards from bracket 17 towards instrument panel body 11. An airbag expansion opening 18a is disposed towards an inner surface of instrument panel body 11.

Referring again to FIGS. 1 through 3, an expansion opening 20, allows the airbag (not shown) of airbag unit 18 to expand. The front edge of expansion opening 20 extends along ridge line 11e. The back edge of expansion opening 20 extends along a passenger seat edge (back edge part) 21. One side edge of expansion opening 20 extends along a central panel left side edge 12a of central fix panel 12. The other edge extends along an instrument panel left side edge 22 of instrument panel body. Central panel left side edge 12a of central panel 12 extends from passenger seat edge 21 to ridge line 11e. Air is centrally directed using a louver 12b. A liquid crystal display 12c of the AV system, along with other instrumentation are disposed on central panel 12.

Referring to FIGS. 2 and 3, a panel attachment edge 23 is disposed along the perimeter of expansion opening 20. Panel attachment edge 23 has a U-shaped cross-section which includes an inner perimeter wall 23a, an outer perimeter wall 23b, and a bottom wall 23c. A panel attachment groove 23d is formed between inner perimeter wall 23a and outer perimeter wall 23b. A flange 13a disposed along the perimeter of sub panel 13 fits within panel attachment groove 23d. Additionally, axial projections 23e are tapered and protrude outward towards airbag unit 18. Axial projections 23e are formed in bottom walls 23c at various intervals.

Figure 5:
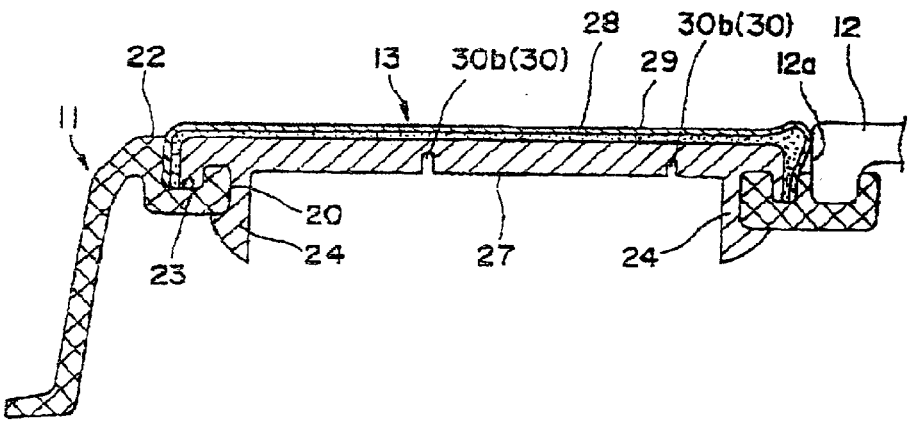
FIG. 5 is a cross-section drawing along line C—C of FIG. 1.

Referring now to FIGS. 1, 2 and 5, the inner surface of the perimeter of sub panel 13 has a plurality of latching tabs 24. Plurality of latching tabs 24 attach sub panel 13 to instrument panel body 11 along the edges of expansion opening 20. Additionally, latching pieces 25 are formed along the inner edge surfaces of sub panel 13 which are parallel to ridge line 11e. Joining holes 25a are formed in latching pieces 25. Axial projections 23e fit into joining holes 25a. Latching pieces 25 are affixed to bottom wall 23c by tapping screws 26. Tapping screws 26 screw into axial projections 23e.

Sub panel 13 is laminated in three layers in the following sequence: a core material 27, a foam layer 28; and a surface covering 29. Core material 27 is formed from resin by injection molding. A cleavage groove 30 is centrally formed on the inner surface of sub panel 13. Cleavage groove 30 is H-shaped and includes a cleavage groove 30a running parallel to ridge line 11e, forming the bar in the H-shape, and a pair of cleavage grooves 30b running perpendicular to ridge line 11e and forming the uprights in the H-shape. Cleavage groove 30 is seamless and cannot be seen from the vehicle interior. Cleavage groove 30 traverses core material 27 and foam layer 28. Cleavage groove 30 is easily cleaved by the expansion pressure of the airbag.

Airbag lid parts 31 are disposed below sub panel 13. Airbag lid parts 31 open when cleavage groove 30 cleaves through the expansion pressure of the airbag. Airbag lid parts 31 are formed above and below cleavage groove 30a. An air conditioning hole 131 is formed on a side edge to sub panel 13. A louver 32 is attached to air conditioning hole 131.

A large section of instrument panel 10 located on the passenger side of the vehicle is covered by sub panel 13. This improves the overall aesthetic appearance of instrument panel 10. When a vehicle collision occurs, airbag lid parts 31 open allowing an airbag to expand outward into the interior region of the vehicle protecting the passenger. Instrument panel 10 is restored by replacing only sub panel 13. This reduces repair costs and simplifies restoration of the vehicle after a collision.

The aesthetic appearance of instrument panel 10 is enhanced because ridge line 11e and the front edge of sub panel 13 coincide, making it appear as though the front edge of sub panel 13 is continuous with instrument panel body 11. Furthermore, central panel left side edge 12a of central panel 12 and the right side edge of sub panel 13 coincide, contributing to the continuous look of instrument panel body 11 and sub panel 13.

EXAMPLES

Figure 4:
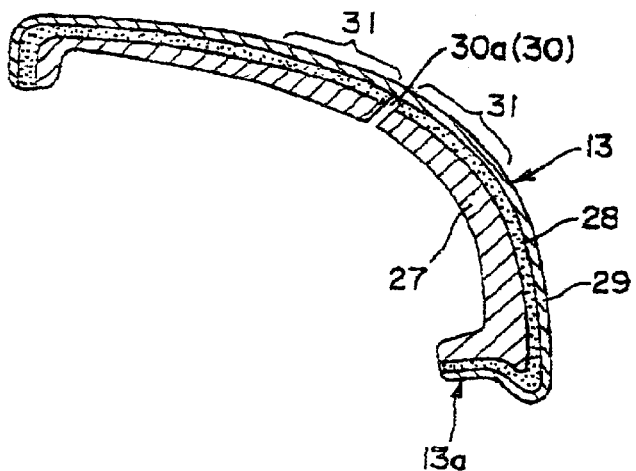
FIG. 4 is a cross-section drawing along line B—B of FIG. 1.

In Mode 1 of the embodiment described above, (see FIG. 4 for example) sub panel 13 is made using a three layer construction consisting of core material 27, foam layer 28, and surface covering 29. However, other constructions are possible.

Figure 6:
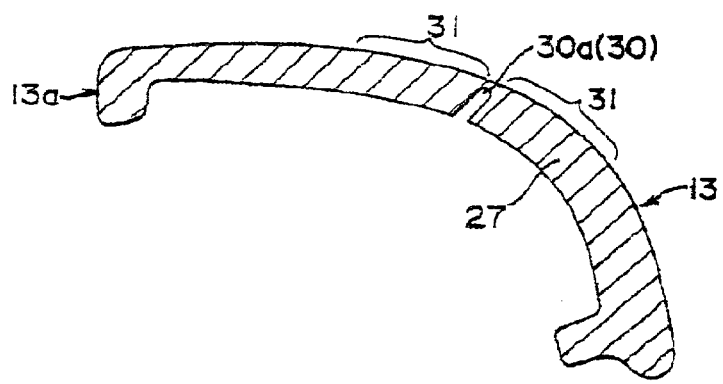
FIG. 6 is a cross-section drawing similar to FIG. 3 of another example of a sub panel shown in FIGS. 1–5.

Referring to FIG. 6, a one layer construction consisting of only core material 27, is illustrated. Cleavage groove 30, which opens along an inner surface of core material 27, closely approaches the outer surface of core material 27.

Figure 7:
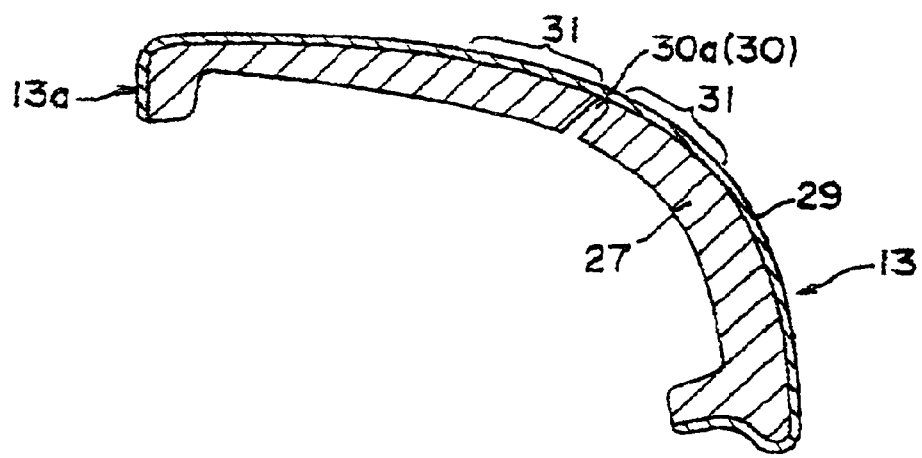
FIG. 7 is a cross-section drawing similar to FIG. 3 of another example of a sub panel shown in FIGS. 1–5.

Referring to FIG. 7, sub panel 13 has a two layer construction of core material 27 and surface covering 29. Cleavage groove 30 traverses all of core material 27 stopping just at the inner surface of surface covering 29.

Figure 8:
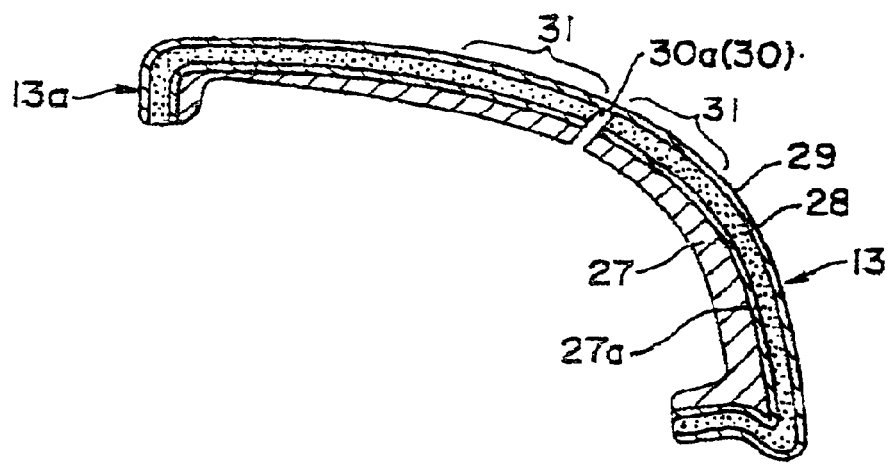
FIG. 8 is a cross-section drawing similar to FIG. 3 of another example of a sub panel shown in FIGS. 1–5.
Figure 9:
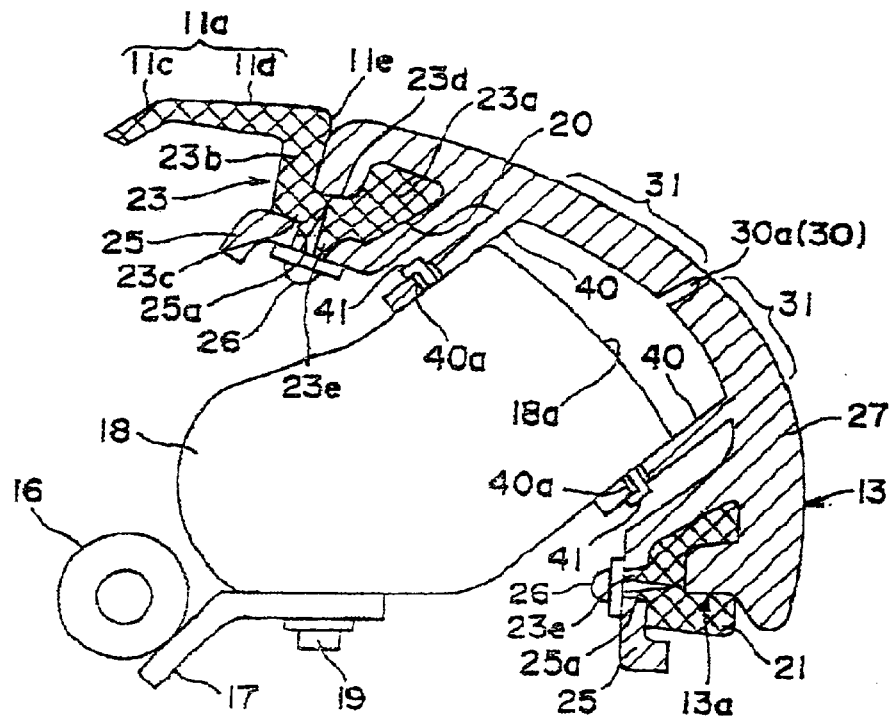
FIG. 9 is a cross-section drawing similar to FIG. 3 of another example of a sub panel shown in FIGS. 1–5.
Figure 10:
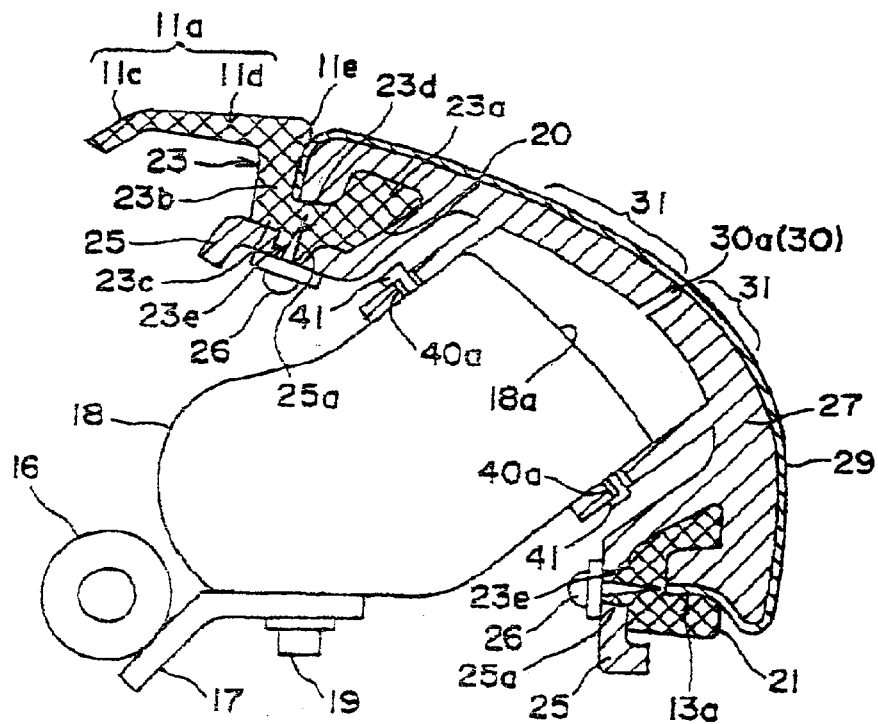
FIG. 10 is a cross-section drawing similar to FIG. 2 of another example of a sub panel shown in FIGS. 1–5.
Figure 11:
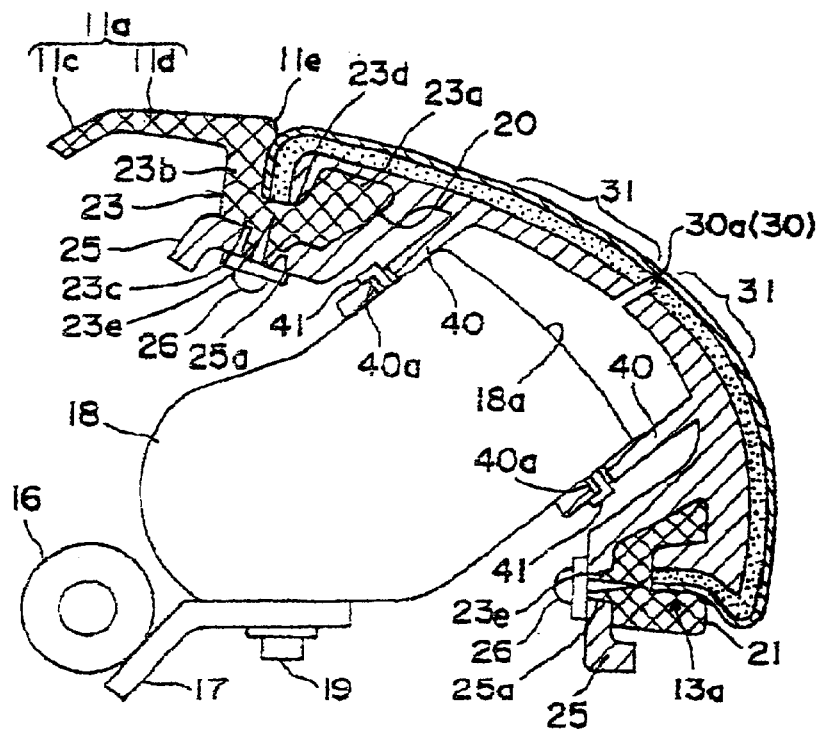
FIG. 11 is a cross-section drawing similar to FIG. 2 of another example of a sub panel shown in FIGS. 1–5.
Figure 12:
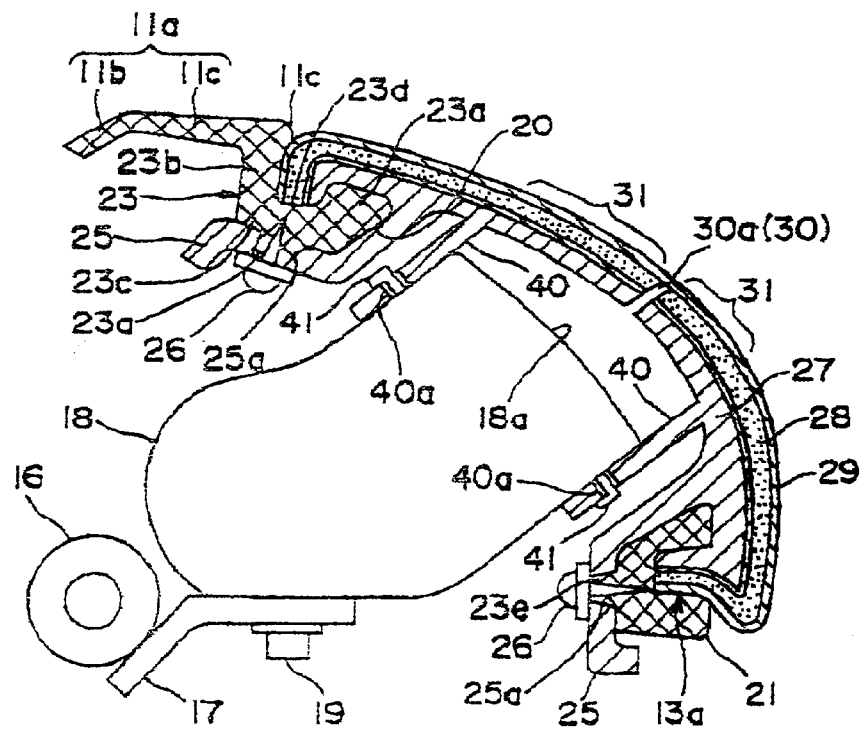
FIG. 12 is a cross-section drawing similar to FIG. 2 of another example of a sub panel shown in FIGS. 1–5.
Figure 13:
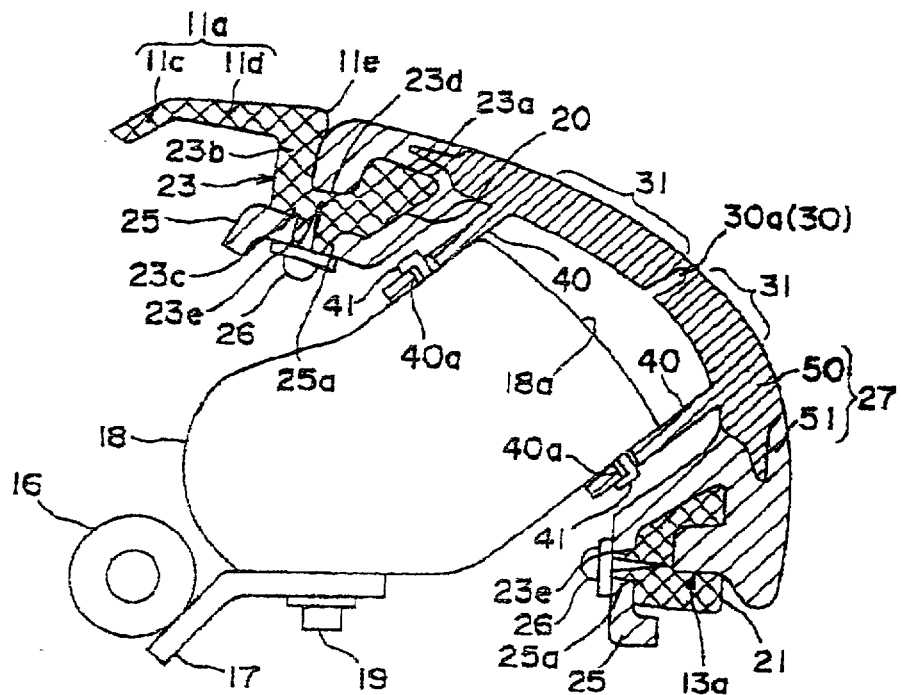
FIG. 13 is a cross-section drawing similar to FIG. 2 of another example of a sub panel shown in FIGS. 1–5.
Figure 14:
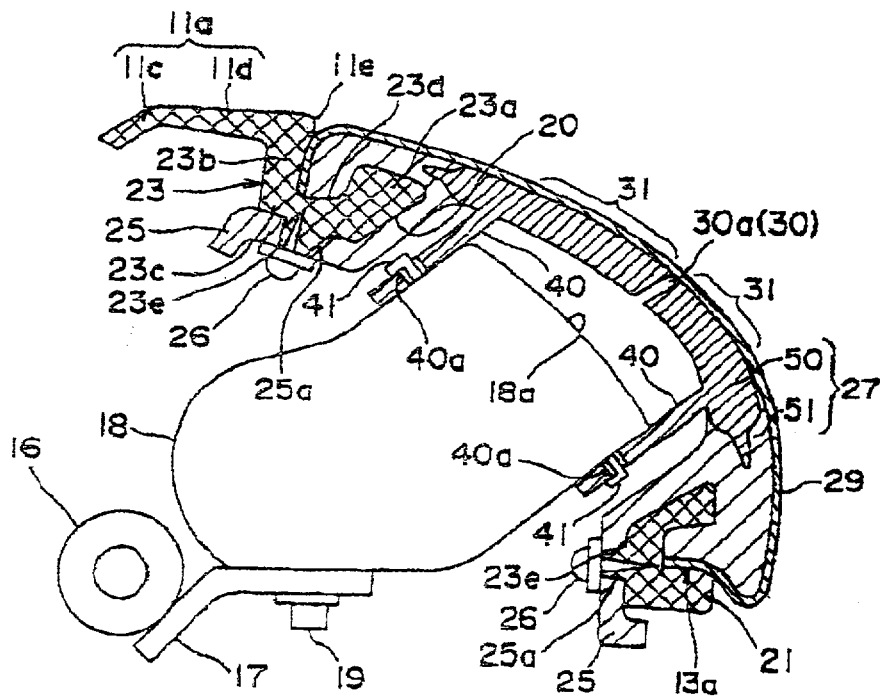
FIG. 14 is a cross-section drawing similar to FIG. 2 of another example of a sub panel shown in FIGS. 1–5.
Figure 15:
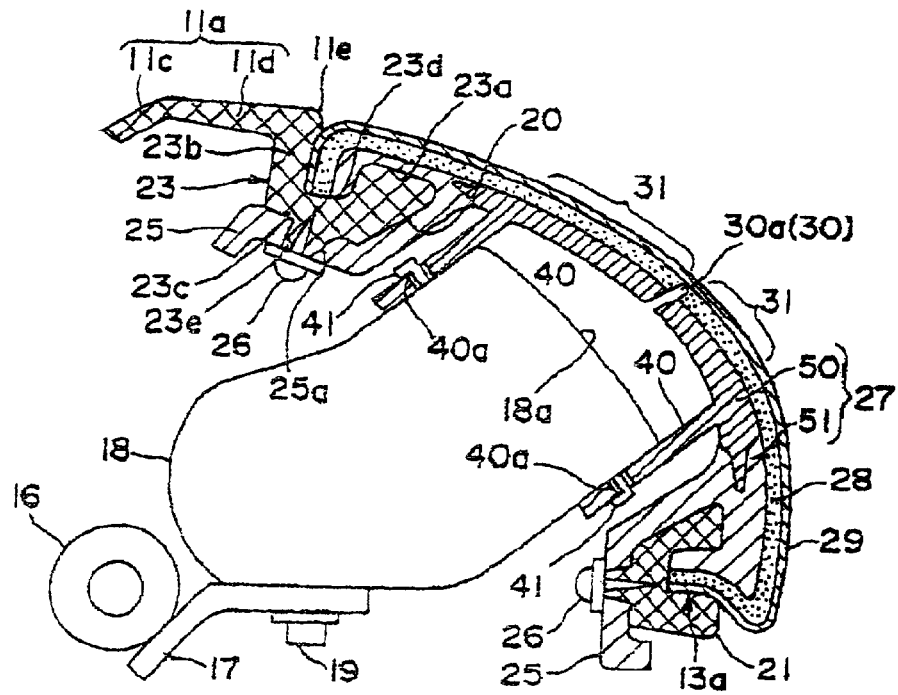
FIG. 15 is a cross-section drawing similar to FIG. 2 of another example of a sub panel shown in FIGS. 1–5.
Figure 16:
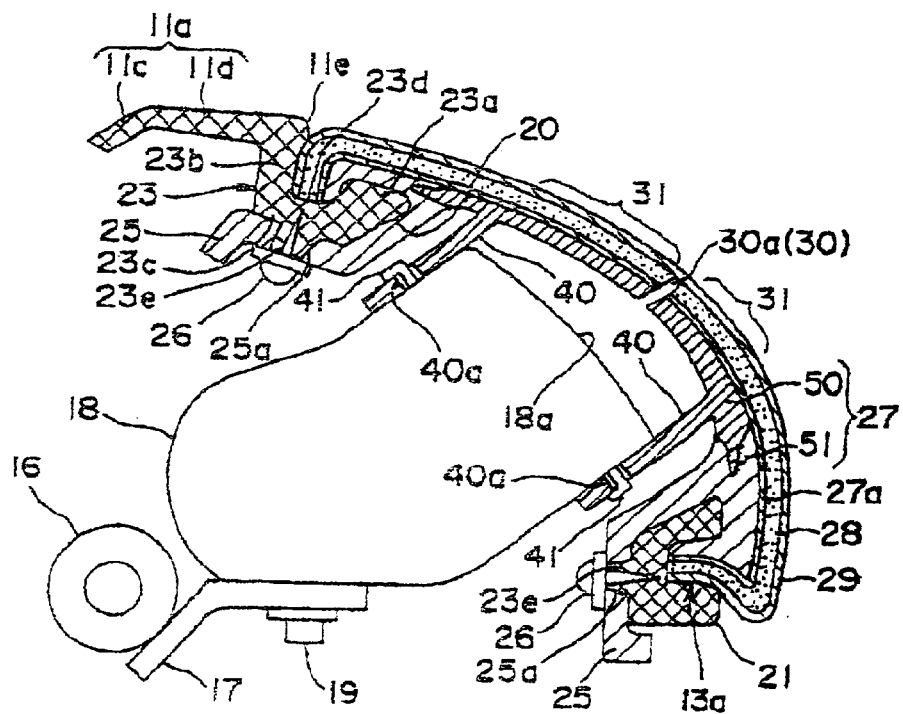
FIG. 16 is a cross-section drawing similar to FIG. 2 of another example of a sub panel shown in FIGS. 1–5.

Referring to FIG. 8, sub panel 13 can also be made using a four layer construction in which core material 27, a thermal insulation layer 27a, foam layer 28, and surface covering 29 are laminated sequentially. Cleavage groove 30 extends through core material 27, thermal insulation layer 27a, and foam layer 28, again stopping just at the inner surface of surface covering 29. In forming the four layer construction, thermal insulation layer 27a, foam layer 28, surface covering 29 are formed in advance and set inside the cavity of an injection molding die. Core material 27 is then formed by injecting melted resin into the injection molding die containing the three layer construct. Thermal insulation layer 27a prevents foam layer 28 from melting due to the heat from the melted resin.

Referring to FIGS. 9–12, support pieces (support protrusions) 40 protrude on an inner surface of core material 27, described above. Latching holes 40a are provided on support pieces 40. Latching is achieved by passing latching tabs 41 (which protrude from airbag unit 18) through latching holes 40a. This stabilizes and supports airbag unit 18 within instrument panel 10.

Referring now to FIGS. 13–16, core material 27 includes an airbag lid part 50 and a panel body 51. Airbag lid part 50 is centered and surrounded by panel body 51. Airbag lid part 50 and panel body part 51 of core material 27 is formed by using a multicolored molding heat welding process that uses resin materials with differing material values. Airbag lid part 50 comprises two airbag lid parts 31, which are divided by cleavage groove 30.

The following parts are made of core material 27 with the following properties:

Airbag Lid Part 50

| Bending elasticity coefficient: | 10,000 Kg/cm² ~ 25,000 Kg/cm² |
|---|---|
| Shrinkage factor (%): | 4/1000 ~ 8/1000 |
| Linear expansion coefficient: | $4 \times 10^{-5}$/°C. ~ $10 \times 10^{-6}$/°C. |

Panel Body Part 51

| Bending elasticity coefficient: | 700 Kg/cm² ~ 7,000 Kg/cm² |
|---|---|
| Shrinkage factor (%): | 4/1000 ~ 10/1000 |
| Linear expansion coefficient: | $2 \times 10^{-5}$ ~ $12 \times 10^{-6}$/°C. ~ $12 \times 10^{-5}$/°C. |

Airbag lid part 50 of sub panel 13 is formed from an easily bendable material, while the part surrounding airbag lid part 50 is formed from a highly rigid material. This results in sub panel 13 which looks like it is continuous with instrument panel body 11. When airbag unit 18 is activated, airbag lid part 50 easily opens. By forming airbag lid part 50 and panel body part 51 of resin materials having approximately the same material values for shrinkage factor and linear expansion coefficient an instrument panel 10 has excellent heat cycle resistance with little deformation.

Support pieces 40 are disposed on airbag lid part 50. Each of latching tabs 41 of airbag unit 18 pass through latching holes 40a and are latched.

Referring to FIGS. 9–16, the construction is essentially the same and, therefore, use the same numbers as shown in FIGS. 1–8. The descriptions are likewise abbreviated.

Figure 17:
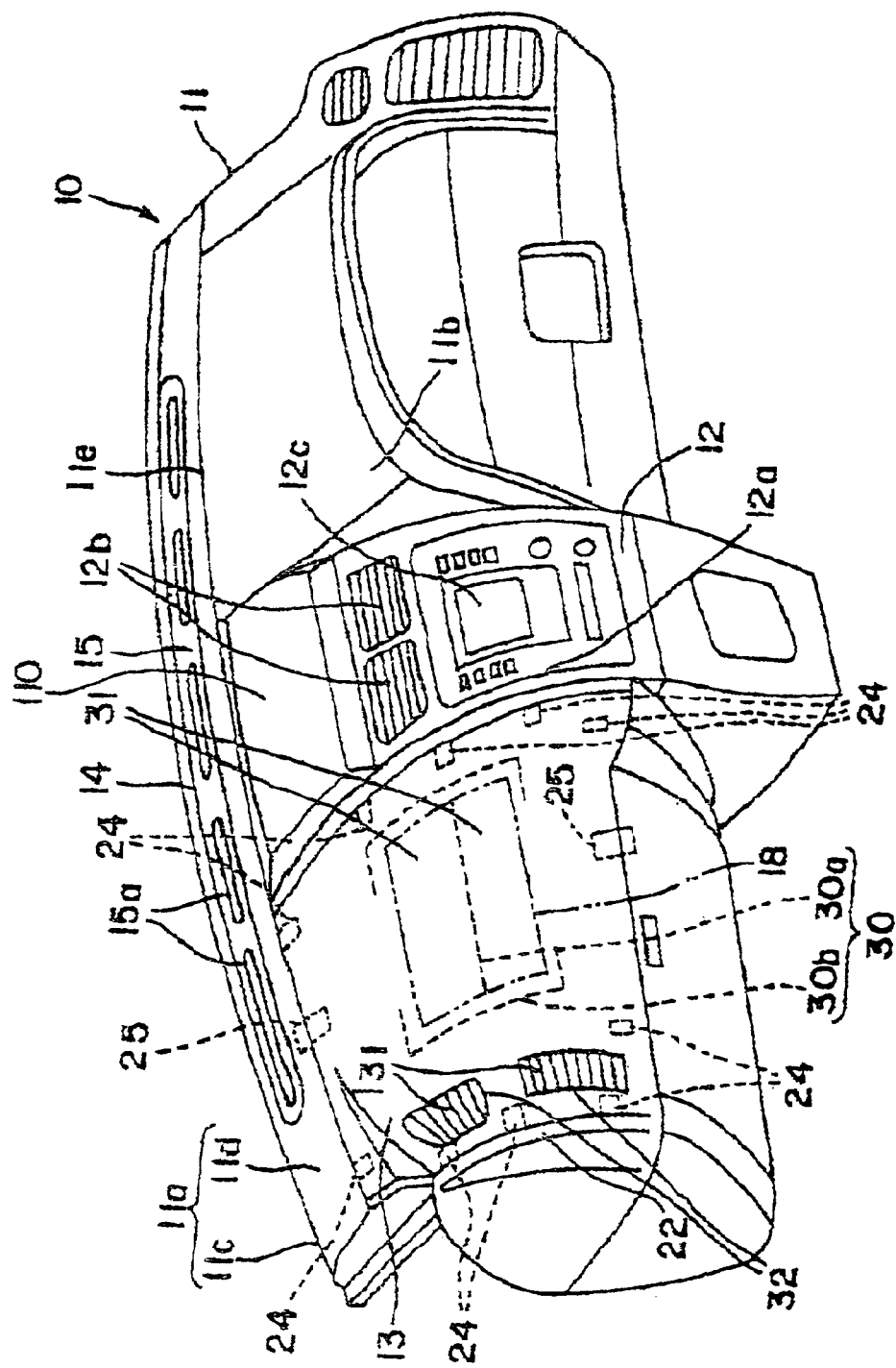
FIG. 17 is a perspective drawing of the instrument panel of yet another embodiment of the invention.
Figure 18:
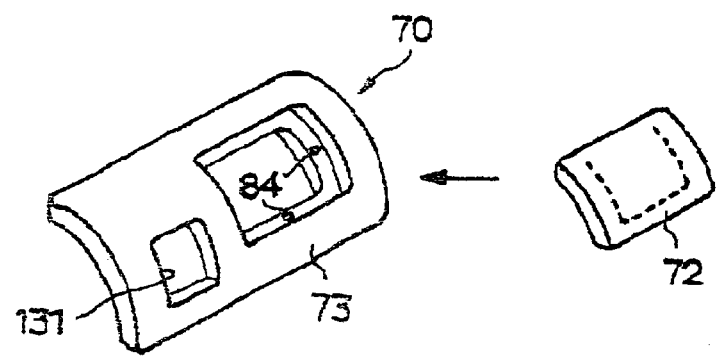
FIG. 18 is an exploded perspective drawing of an airbag lid part and a panel body representing another embodiment of the invention.

Referring to FIG. 17, a vehicle has a lid 110 (this lid opens when the display device, which is housed within the instrument panel, is pushed during navigation activation) which comprises part of a pop-up style navigation system located at the top part of central panel 12. The side edges of lid 110 coincide with the side edges of sub panel 13. The side edges of lid 110 extend to ridge 11e. This enhances the look of instrument panel body 11 and makes it appear to be a continuous structure.

Referring now to FIGS. 18–21, sub panel 13 includes a laminate sheet 71 affixed on a core material 70. Core material 70 has separate members which include an airbag lid part 72 and a panel body part 73. Panel body 73 surrounds airbag lid part 72. Airbag lid part 72 and panel body part 73 are fitted together.

Panel body part 73 is constructed from a normal PPC material or other appropriate material. Airbag lid part 72 is constructed from TPO material or TEO material or other appropriate material which has good low temperature properties. A joining part 74 protrudes along an edge of panel body part 73. Joining part 74 fits within a receiving groove 75 disposed on airbag lid 72.

Figure 19:
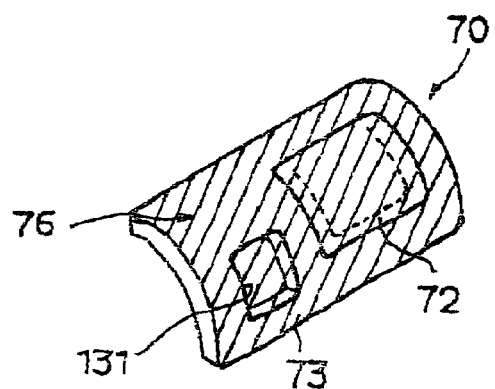
FIG. 19 is a perspective drawing showing the condition where the airbag lid part and the panel body of FIG. 18 are joined together.
Figure 20:
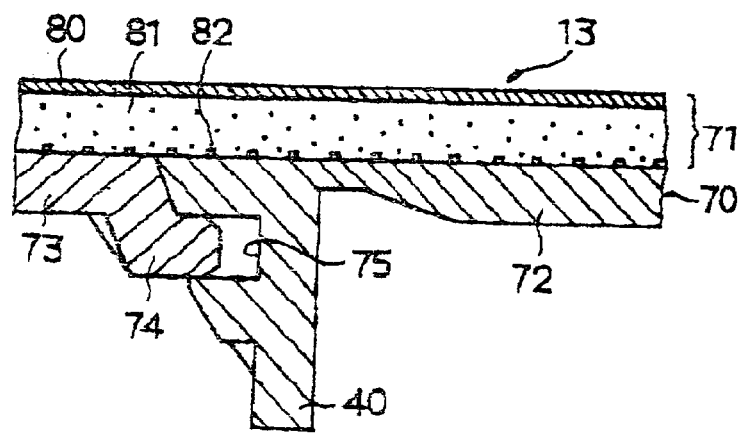
FIG. 20 is a partial expanded cross-section showing the condition where a laminate sheet is attached to the core material of FIG. 19.

Referring to FIGS. 19 and 20, both body panel 73 and airbag lid 72 are joined by force fitting them into there respective opening. A guide pin 84 can be formed on panel body part 73 to correctly position airbag lid part 72.

Referring to FIG. 19, the surface of core material 70 is coated with an adhesive 76. Adhesive 76 covers panel body part 73 and airbag lid part 72. Suitable examples of adhesive 76 include rubber, butyl rubber, or styrene type adhesives. Other suitable adhesives could be used.

Figure 21:
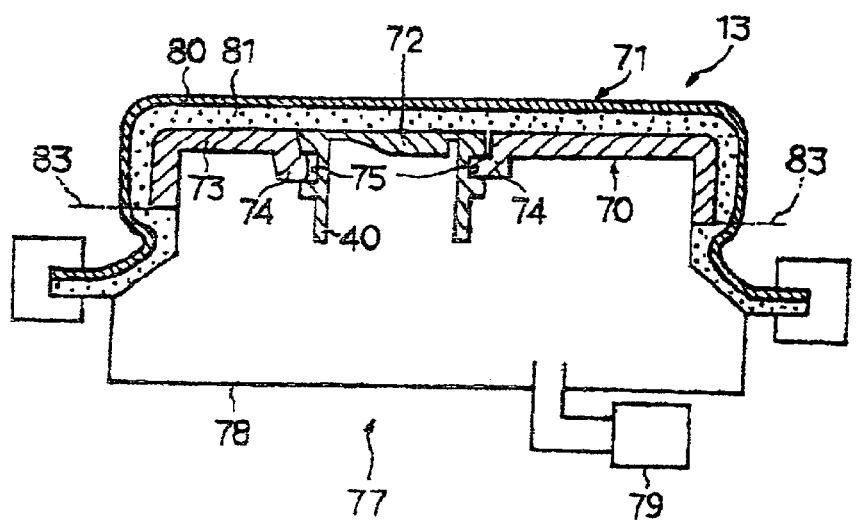
FIG. 21 shows the condition where the sub panel of FIG. 19 is being vacuum molded.
Figure 22:
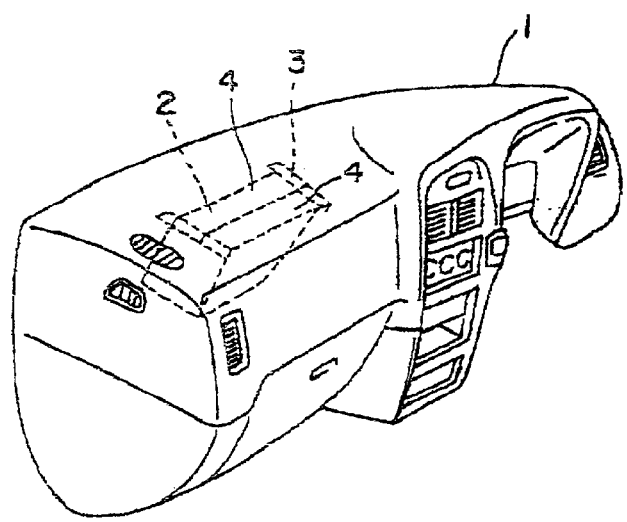
FIG. 22 is a schematic perspective drawing of an example of the instrument panel of the prior art.

Referring to FIGS. 20 and 21, core material 70 is placed in a vacuum receiving mold 78 of a vacuum molding device 77. Laminate sheet 71 is placed on the surface of core material 70 and vacuum is applied using a vacuum source 79. Vacuum source 79 can include a vacuum tank with a vacuum attachment to conduct the vacuum where required. Laminate sheet 71 is a sheet material has a surface covering 80 and a foam layer 81. Surface covering 80 is made of a TPO material having good low temperature properties. Foam layer 81 is a PPF foam body and other appropriate material. In order to improve the adhesion between core material 70 and laminate sheet 71, a drawing process can be used or jagged grooves can be formed on the surface of core material 70. Alternatively, jagged grooves 82 can be formed on laminate sheet 71. In order to conduct the vacuum, small vacuum suction holes are formed in core material 70. Other embodiments are possible, for example, the core material could be formed from metal.

Referring to FIG. 21, sub panel 13 is complete when removed from the mold and cut along a dashed line 83.

By constructing panel body part 73 and airbag lid part 72 separately, core material 70 is easily and inexpensively produced without having to use the two color molding device indicated in FIGS. 13–16.

Furthermore, since vacuum molding device 77 is used for the adhesion between laminate sheet 71 and core material 70 only has a vacuum receiving mold 78, the cost is kept low. In this way, sub panel 13 is easily and inexpensively produced.

For surface coverings 29 and 80 that cover cleavage groove 30, a material having the following properties is used:

at −40 degrees C (low temperature);
    tensile strength 250×9.8 N/cm² (250 Kgf/cm²)~500× 9.8 N/cm² (500 Kgf/cm²);
    extension percentage 50(%) or greater, and
    tearing strength 10×9.8 N/cm² (10 Kgf/cm²) or greater;
at 23 degrees C (normal temperature);
    tensile strength 50×9.8 N/cm² (50 Kgf/cm²)~100×9.8 N/cm² (100 Kgf/cm²);
    extension percentage 100(%) or greater, and
    tearing strength 10×9.8 N/cm² (10 Kgf/cm²) or greater; and
at 85 degrees C (high temperature);
    tensile strength 10×9.8 N/cm² (10 Kgf/cm²)~100×9.8 N/cm² (100 Kgf/cm²);
    extension percentage 150–500(%) or greater; and
    tearing strength 5×9.8 N/cm² (5 Kgf/cm²) or greater.

Some examples of surface coverings 29 and 80 having the above properties include the following:

1. TEO (TPO) thermoplastic olefin
2. TPU (PUR) thermoplastic urethane
3. TPVC (PVC) vinyl chloride
4. TPEE (TEEE) thermoplastic ester elastomer
5. SBC (TPS) styrene (polysterene, polybutadiene, or polyisoprene) and the like.

The method for molding surface coverings 29 and 80 is as follows:

1. Vacuum molding depression/protrusion pull
2. Powder slush molding (by freezing pulverization or with microbeads pulverized material)
3. Spray molding
4. Sol slush molding
5. Calender molding
6. Extrusion molding
7. Inflation molding and the like.

Furthermore, surface coverings 29 and 80 can have the following constructions:

1. Total instrument panel (used on the entire surface of instrument panel 10.)
2. Partial instrument panel (used on parts of instrument panel 10.)

3. Partial separate instrument panel (used only on airbag lid parts 31, 50 and 72 for the passenger seat).

By using materials such as those listed above, surface coverings 29 and 80 have relatively high extension percentages at low temperatures. Thus when the airbag deploys, surface coverings 29 and 80 are prevented from scattering. Furthermore, by using materials which have relatively low extension percentages at high temperatures, delays in opening time are prevented.

Because a large part of instrument panel 10 on the passenger seat side is sub panel 13, the overall appearance is enhanced. Furthermore, after airbag lid part 31 opens due to the expansion of the airbag, only sub panel 13 needs to be exchanged. As a result, repair costs are reduced.

Because ridge line 11e coincides with a front edge of sub panel 13, sub panel 13 appear as though it is continuous instrument panel body 11.

Central panel 12 includes a center air blowing louver 12b and liquid crystal display. The side edges of central panel 12 align with the respective edge of sub panel 13. This results in a continuous looking instrument panel body that enhances the aesthetics of the vehicle in which it is installed.

Airbag unit 18 is supported and stabilized by instrument panel 10.

Airbag lid part 31 is formed from a material that is easily bent and deformed, while the area surrounding airbag lid part 31 is made of a highly rigid material. As a result sub panel 13 looks continuous with instrument panel body 11, while allowing airbag lid parts 31 to easily open when airbag unit 18 is activated.

The description of the embodiments discussed supra refer to an instrument panel located on the passenger's side of a vehicle having a steering column on the right hand side. Of course, one skilled in the art would understand that the present invention would also work in a vehicle having the driver and passenger sides reversed such as those vehicles intended for use in the United States.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A vehicle instrument panel comprising:
   an instrument panel body having an opening;
   said opening extending over substantially an entire passenger seat side portion of said instrument panel body;
   a sub panel molded separately from said instrument panel body;
   said opening being removably closed by said sub panel;
   said sub panel having at least one cleavage groove disposed on a surface of said sub panel whereby when an airbag is deployed, said cleavage groove splits open;
   said surface proximate said airbag;
   a flange at a perimeter edge of said sub panel
   a panel attachment groove at an edge of said opening, whereby said flange fits within said panel attachment groove when said opening is removably closed by said sub panel and
   said sub panel covering less than all of said instrument panel body;
   whereby a replacement of said sub panel is simplified.

2. A vehicle instrument panel according to claim 1 wherein an upper surface of said sub panel appears to be continuous with an exposed surface of said instrument panel body.

3. A vehicle instrument panel according to claim 1 wherein:
   said opening having a front edge, a seat edge, a side edge and a center side edge.

4. A vehicle instrument panel according to claim 2, further comprising:
   an airbag lid part disposed on said sub panel;
   said airbag lid part being openable; and
   a panel body surrounding said airbag lid part.

5. A vehicle instrument panel according to claim 3, further comprising:
   a ridge line:
   said ridge line being disposed on said front edge; and
   said ridge line extending from said center side edge to said side edge.

6. A vehicle instrument panel according to claim 1, further comprising:
   a central panel having a central panel edge;
   said central panel being disposed on a generally central portion of said instrument panel body; and
   said center side edge being disposed along said central panel edge.

7. A vehicle instrument panel according to claim 4, further comprising:
   an air conditioning vent disposed near said side edge of said sub panel; and
   said airbag lid part being disposed in a generally central portion of said sub panel.

8. A vehicle instrument panel according to claim 1, further comprising an airbag unit support being disposed on an inner surface of said sub panel.

9. A vehicle instrument panel according to claim 4, wherein:
   said airbag lid part and said panel body are formed using a multicolored molding process.

10. A vehicle instrument panel according to claim 4, wherein:
    said airbag lid part and said panel body are made as separate parts; and
    said airbag lid part being fixably attached to said panel body.

11. A vehicle instrument panel according to claim 1, wherein:
    said sub panel having a front surface with a material which;
    at minus 40 degrees C;
    has a tensile strength of between $250 \times 9.8$ N/cm$^2$ (250 Kgf/cm$^2$) and $500 \times 9.8$ N/cm$^2$ (500 Kgf/cm$^2$), an extension percentage of at least 50%, and a tearing strength of at least $10 \times 9.8$ N/cm$^2$ (10 Kgf/cm$^2$); and
    at 85 degrees C;
    has a tensile strength in a range of $10 \times 9.8$ N/cm$^2$ (10 Kgf/cm$^2$) to $100 \times 9.8$ N/cm$^2$ (100 Kgf/cm$^2$), an extension percentage in a range of 150 to 500 (%), and a tearing strength of at least $5 \times 9.8$ N/cm$^2$ (5 Kgf/cm$^2$).

12. A vehicle instrument panel according to claim 1, wherein said sub panel includes at least a core material providing rigidity.

13. A vehicle instrument panel according to claim 12, wherein said sub panel further includes at least one of a foam layer, a thermal insulation layer, and a surface covering.

14. A vehicle instrument panel according to claim 1, further comprising:
    engaging means for removably attaching said sub panel to said opening.

15. A vehicle instrument panel according to claim 14, wherein said engaging means includes one of an engaging claw and a screw.

* * * * *